US011308423B2

(12) United States Patent
Grehant

(10) Patent No.: US 11,308,423 B2
(45) Date of Patent: Apr. 19, 2022

(54) UPDATE OF A MACHINE LEARNING SYSTEM

(71) Applicant: DASSAULT SYSTEMES, Velizy Villacoublay (FR)

(72) Inventor: Xavier Grehant, Colombes (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 839 days.

(21) Appl. No.: 15/395,244

(22) Filed: Dec. 30, 2016

(65) Prior Publication Data

US 2017/0193402 A1 Jul. 6, 2017

(30) Foreign Application Priority Data

Dec. 31, 2015 (EP) ..................... 15307196

(51) Int. Cl.
*G06N 20/20* (2019.01)
*G06N 20/00* (2019.01)
*G06F 16/35* (2019.01)

(52) U.S. Cl.
CPC .......... *G06N 20/20* (2019.01); *G06F 16/35* (2019.01); *G06N 20/00* (2019.01)

(58) Field of Classification Search
CPC ........ G06N 20/00; G06N 20/10; G06N 20/20; G06F 16/35; G06K 9/4676
See application file for complete search history.

(56) References Cited

U.S. PATENT DOCUMENTS

| 8,762,299 | B1 | 6/2014 | Breckenridge et al. |
| 8,843,427 | B1 * | 9/2014 | Lin .................. G06N 20/00 706/45 |
| 2007/0067279 | A1 | 3/2007 | Bonabeau et al. |

(Continued)

FOREIGN PATENT DOCUMENTS

| CN | 105045799 A | 11/2015 |
| EP | 2 940 606 A1 | 11/2015 |

(Continued)

OTHER PUBLICATIONS

Extended European Search Report dated Jun. 30, 2016 in Patent Application No. 15307195.6.

(Continued)

*Primary Examiner* — Miranda M Huang
*Assistant Examiner* — Yao David Huang
(74) *Attorney, Agent, or Firm* — Oblon, McClelland, Maier & Neustadt, L.L.P.

(57) ABSTRACT

The invention notably relates to a computer-implemented method for updating a model of a machine learning system. The method comprises providing a first set of observations of similar events, each observation being associated with one or more variables, each variable being associated with a value, and with a target value; indexing each observation of the first set with its corresponding one or more variables and target value; receiving, on the index, a query allowing a selection of a subset of the first set of observations; returning, as a result of the query, a subset of the first set of observations; providing a second model; training the provided second model with the returned subset of the first set of observations; and loading the trained second model.

9 Claims, 4 Drawing Sheets

(56) References Cited

U.S. PATENT DOCUMENTS

| | | | |
|---|---|---|---|
| 2008/0250265 A1* | 10/2008 | Chang | G06F 11/0709 714/4.12 |
| 2008/0281764 A1* | 11/2008 | Baxter | G06K 9/6256 706/12 |
| 2009/0074306 A1* | 3/2009 | Liu | G06F 16/583 382/229 |
| 2012/0284213 A1 | 11/2012 | Lin et al. | |
| 2013/0103617 A1 | 4/2013 | Desai | |
| 2013/0254153 A1* | 9/2013 | Marcheret | G06N 7/00 706/59 |
| 2014/0046879 A1 | 2/2014 | Maclennan et al. | |
| 2014/0188768 A1 | 7/2014 | Bonissone et al. | |
| 2014/0258189 A1* | 9/2014 | Schmidt | G06F 17/246 706/12 |
| 2014/0358828 A1* | 12/2014 | Phillipps | G06N 20/00 706/12 |
| 2015/0006442 A1 | 1/2015 | Ogilvie et al. | |
| 2015/0199010 A1* | 7/2015 | Coleman | A61B 5/0006 345/156 |
| 2015/0317357 A1* | 11/2015 | Harmsen | G06N 5/025 707/723 |
| 2015/0339572 A1* | 11/2015 | Achin | G06N 5/04 706/46 |
| 2015/0379429 A1* | 12/2015 | Lee | G09B 5/00 706/11 |
| 2016/0085783 A1* | 3/2016 | Cevahir | G06F 16/2237 707/738 |
| 2016/0088006 A1* | 3/2016 | Gupta | H04L 43/08 726/23 |

FOREIGN PATENT DOCUMENTS

| | | |
|---|---|---|
| JP | 2003-303329 A | 10/2003 |
| JP | 2004-326200 A | 11/2004 |
| JP | 2006-252333 A | 9/2006 |
| JP | 2007-41950 A | 2/2007 |
| JP | 2013-143009 A | 7/2013 |
| JP | 2015-82259 A | 4/2015 |
| WO | WO 02/06953 A1 | 1/2002 |
| WO | WO 2015/126858 A1 | 8/2015 |

OTHER PUBLICATIONS

Extended European Search Report dated Jun. 30, 2016 in Patent Application No. 15307196.4.
Extended European Search Report dated Jun. 30, 2016 in Patent Application No. 15307194.9.
Extended European Search Report dated Jun. 30, 2016 in Patent Application No. 15307193.1.
Japanese Office Action dated Jan. 5, 2021 in Japanese Patent Application No. 2016-255137 (with English translation), 10 pages.
Japanese Office Action dated Feb. 2, 2021 in Japanese Patent Application No. 2016-255148 (with English translation), 4 pages.
Japanese Office Action dated Dec. 22, 2020 in Japanese Patent Application No. 2016-255145 (with English translation), 10 pages.
Combined Chinese Office Action and Search Report dated Apr. 19, 2021 in Chinese Patent Application No. 201611273149.2 (with English translation), 22 pages.
Combined Chinese Office Action and Search Report dated May 10, 2021 in Chinese Patent Application No. 201611273148.8 (with English translation), 21 pages.
Office Action dated Aug. 23, 2021 in Chinese Patent Application No. 201611273107.9 (with English translation); 16 pgs.

* cited by examiner

UPDATE OF A MACHINE LEARNING SYSTEM

CROSS-REFERENCE TO RELATED APPLICATIONS

This application claims priority under 35 U.S.C. § 119 or 365 to European Application No. 15307196.4, filed Dec. 31, 2015. The entire contents of the above application(s) are incorporated herein by reference.

FIELD OF THE INVENTION

The invention relates to the field of computer programs and systems, and more specifically to a method, system and program for updating a machine learning system.

BACKGROUND

Recommendations are used for decision making in engineering. For instance, in an ongoing satellite launch, recommending emergency actions is needed to minimize a function of the risk of incidents (e.g. controlling the temperature of the fuel tanks, fuel consumption, speed of the launcher . . . ) Recommendations are not limited to the control of a device, but they can also be used during the conception and the manufacturing of a device, e.g. a CAD system can provide recommendations for the design of a device so that the risk of malfunctioning of the designed device is minimized.

There are several known categories of recommendation systems. A first category comprises the so-called recommender systems that are systems in which a visitor receives content suggestions based on the contents already visited. For instance, a search engine ranks search results based on personal history of pages visited. Examples of such systems are discussed in Balabanović, Marko, and Yoav Shoham. "*Fab: content-based, collaborative recommendation.*" Communications of the ACM 40.3 (1997): 66-72, or also in Sarwar, Badrul, et al. "*Item-based collaborative filtering recommendation algorithms.*" Proceedings of the 10th international conference on World Wide Web. ACM, 2001.

However, these recommender systems work in applications that centralize the history of a large number of users. For example Google© search has more than 1 billion users. Systems that are hosted on the server of a company do not have such a pool of decision-makers to learn from. Decision-makers typically use best business practice or management consulting firms for advice based on accumulated experience of their peers in similar situations. But the relative isolation of business, operational and equipment data from different companies make it difficult to automate this learning process by computer programs. So rather than looking at the history of decisions from their peers, decision-makers assess situations based on data descriptive of the situation that triggers the need for a decision (variables descriptive of their own operations and equipment for instance). Therefore, these recommender systems are not suited for these situations A second category comprises the expert systems that automate decision making related to certain problem, based on rules written by experts and applied automatically. When the number of options is small and the input variables are manageable by a person, or processed to be summarized in a manageable set of discriminative variables, then it is possible for an expert to specify rules that will produce the optimal action in most cases. The first approach is called "expert rules only" wherein the rules are manually written by an expert of the technical filed on which the system will be applied. The second approach is called "expert rules combined with empirical models" in which an empirical model is built based on machine learning to process the available inputs and return a manageable number of inputs. Such models would typically return an estimated probability. The room for human error is reduced because the complexity of the inputs provided to human-written rules is reduced.

An example of empirical models, includes the empirical rule generation systems such as Delmia OI ©. These systems illustrate the complexity required to handle such phenomena. Empirical rule generation systems model phenomena described by large numbers of variables. They work by producing many rules with individually low recall and low precision, and therefore potentially mutually contradictory, resolving their different outcomes with a vote, and outputting the result of the vote, which is used as a new synthetic variable to describe the situation. These systems typically achieve simultaneously high recall and high precision (above 80% each) but to do so, produce an unmanageable number of rules (to the order of tens of thousands to millions for a few dozen variables) that could not have been produced by experts.

However, this second category suffers many drawbacks; notably, the first approach does not work when the number of independent factors and the number of options lead to a problem not manageable by a human expert. The second approach requires substantial hardware resources to train empirical models. In practice the need for decisions is typically triggered by new data. And decisions typically have to be taken quickly. Thus further restraining the amount of resources available and the number of cases where these systems can be used.

In a third category, is included the empirical rule generation systems such as Delmia OI. These systems illustrate the complexity required to handle such phenomena. Empirical rule generation systems model phenomena described by large numbers of variables. They work by producing many rules with individually low recall and low precision, and therefore potentially mutually contradictory, resolving their different outcomes with a vote, and outputting the result of the vote, which is used as a new synthetic variable to describe the situation. These systems typically achieve simultaneously high recall and high precision (above 80% each) but to do so, produce an unmanageable number of rules (to the order of tens of thousands to millions for a few dozen variables) that could not have been produced by experts.

Such systems can be successfully used in approach "expert rules combined with empirical models" in cases with many input parameters and two decision alternatives.

However, such empirical models do not let decision-makers take into account data that did not exist or was not taken into account when training the systems and writing the expert rules. In addition, this third category may require substantial hardware resources to train. In practice the need for decisions is typically triggered by new data. And decisions typically have to be taken quickly. Thus further restraining the amount of resources available and the number of cases where these systems can be used.

A third category comprises understandable models, representations and interactive interfaces that help make decisions, by presenting the relevant information in a form that makes it manageable by the decision-makers or their aids. For instance, Business Intelligence tools provide means to select variables and visualize their interactions for instance by way of scatter plots. Analysts pick relevant visualizations, produce static reports and send them to decision-makers.

The so-called "Whitebox models" rely on empirical (trained) model giving a visualization or explanation of the relationships between the variables. For instance, after training decision trees (as discussed for example in Quinlan, J. Ross. "*Induction of decision trees.*" Machine learning 1.1 (1986): 81-106. [1]), rules building engine, or bayesian networks (as discussed for example in Heckerman, David, Dan Geiger, and David M. Chickering. "*Learning Bayesian networks: The combination of knowledge and statistical data.*" Machine learning 20.3 (1995): 197-243), it is possible to understand the rules that, with some probability, link a target variable to a number of premises among the variables that describe the phenomenon.

When input data can be represented in a graph, techniques exist to map the graph into a 2-dimensional drawing in such a way that the distance between two entities on the 2D map is representative of their connectivity in the graph. These techniques allow to qualitatively represent the degree of interaction between elements descriptive of the situation. These techniques can also be applied to map complex observations on a 2D map so that similar observations (close in N dimensions, where the dimensions are the variables descriptive of the observations) end up close to one another on the 2D map, as discussed for example in Balasubramanian, Mukund, and Eric L. Schwartz. "*The isomap algorithm and topological stability.*" Science 295.5552 (2002): 7-7.

Clustering techniques are discussed in Jain, Anil K., M. Narasimha Murty, and Patrick J. Flynn. "*Data clustering: a review.*" ACM computing surveys (CSUR) 31.3 (1999): 264-323 and these clustering techniques allow to group together in a manageable number of groups observations that are similar in N dimensions.

Dimension reduction techniques are discussed in Wall, Michael E., Andreas Rechtsteiner, and Luis M. Rocha. "*Singular value decomposition and principal* component analysis." A practical approach to microarray data analysis. Springer US, 2003. 91-109, and they allow to find the dimensions, or combination of dimensions, along which data varies the most.

Other techniques exist to find what dimensions (descriptive variables) have the highest impact on the value of a given target variable.

However, the "Whitebox models" suffer several drawbacks. Notably, these systems still do not provide fully automated decisions and therefore allow for suboptimal decisions due to human error such as omission of an important factor or inaccurate estimate of the actual impact of the factors taken into account.

Another problem is that this third category requires substantial hardware resources to train. In practice the need for decisions is typically triggered by new data. And decisions typically have to be taken quickly. Thus further restraining the amount of resources available and the number of cases where these systems can be used.

More specifically, a direct use of empirical models suffers the following performance problems when directly used to model realistic events involving complex systems.

The first performance problem is related to memory footprint problem. The number of relevant parameters is typically large to describe a situation involving a complex system. Hence describing the situation in its entirety with the input variables of the model would result in a proliferation of input variables that would make training a model unrealistic during the course of an event.

As variables proliferate, so do the number of observations necessary in the training data. In brief, the observations in the training data must be representative of all possible combinations of variables that can actually occur for the trained model to perform correctly.

Most of the available machine-learning methods are designed by assuming that the training data fits in random access memory. The available size of random access memory typically puts a limit to the parameters that can be taken in account to describe the situation.

The second performance problem is a problem of salability. Some precise machine learning algorithms don't scale well. It is the case for example with boosting techniques. Boosting techniques are currently among the most powerful machine learning techniques for recall and precision but they are sequential in essence. This means they cannot be distributed across multiple servers. One server will be busy running the computation while the others will stay idle. The time to run sequential algorithms will not decrease as the number of servers increases.

The same memory footprint and scalability problems apply when retraining the model during the course of an event.

In addition, since time is limited, latency becomes also a problem. Depending on the model, on the size of the training data, and on the available hardware resources training a model takes seconds to weeks. When realistic situations involving complex systems are modeled, in most cases training a model must take at least several dozens of seconds. Hence opportunities to train a model during the course of an event will be small.

Within this context, there is still a need for updating a model of a machine learning system.

SUMMARY OF THE INVENTION

It is therefore provided a computer-implemented method for updating a model of a machine learning system. The method comprises:
  providing a first set of observations of similar events, each observation being associated with a target value and with one or more variables, each variable being associated with a value corresponding to the observation;
  indexing each observation of the first set with its corresponding one or more variables and target value;
  receiving, on the index, a query allowing a selection of a subset of the first set of observations;
  returning, as a result of the query, a subset of the first set of observations;
  providing a second model;
  training the provided second model with the returned subset of the first set of observations; and
  loading the trained second model.

The method may comprise one or more of the following:
  providing a first model; training the first model with the first set of observations; storing the trained first model.
  before receiving a query on the index: collecting a second set of observations of current events; and wherein receiving a query on the index further comprises receiving, on the index, a query allowing a selection of a subset of the first set of observations, the query being performed with one or more variables of the second set of observations;
  before receiving a query on the index: identifying one or more variables of the second set of observations; and wherein receiving a query on the index further comprises receiving, on the index, a query allowing a selection of a subset of the first set of observations, the query being performed with the identified one or more variables of the second set of observations.

identifying one or more variables of the second set of observations comprises identifying (S210) slow moving variables and/or identifying fast moving variables;

identifying one or more unknown variables among the variables of the second set of observations; and indexing each observation of the second set associated with the identified one or more unknown variables, the indexing of each observation of the second set being performed with the corresponding one or more variables and target value of each observation of the second set.

collecting the second set of observations further comprises collecting in real time the set of second observations; storing the collected second set of observations; and providing an access to the collected second set of observations before a predetermined period of time elapsed;

after loading the trained second model: providing one or more options by setting input variables of a set of input variables with a value; computing an outcome for the trained second model by using the provided one or more options;

providing one or more options further comprises computing combinations of the values of input variables; and wherein computing an outcome for the trained second model further comprises computing an outcome for the trained second model by using the combinations computed;

after computing combinations of the values of input variables: receiving values of variables of the second set of observations; computing combinations of the values of input variables and values of variables of the second set of observations; computing an outcome for the trained second model by using the combinations of the values of input variables and of variables of the set of second observations;

It is further provided a computer program comprising instructions for performing the method.

It is further provided a computer readable storage medium having recorded thereon the computer program.

It is further provided a server comprising a processing circuitry coupled to a memory, the memory having recorded thereon the computer program.

The server may be connected to a client computer from which the query on the one index is generated and from which the one or more options are provided.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
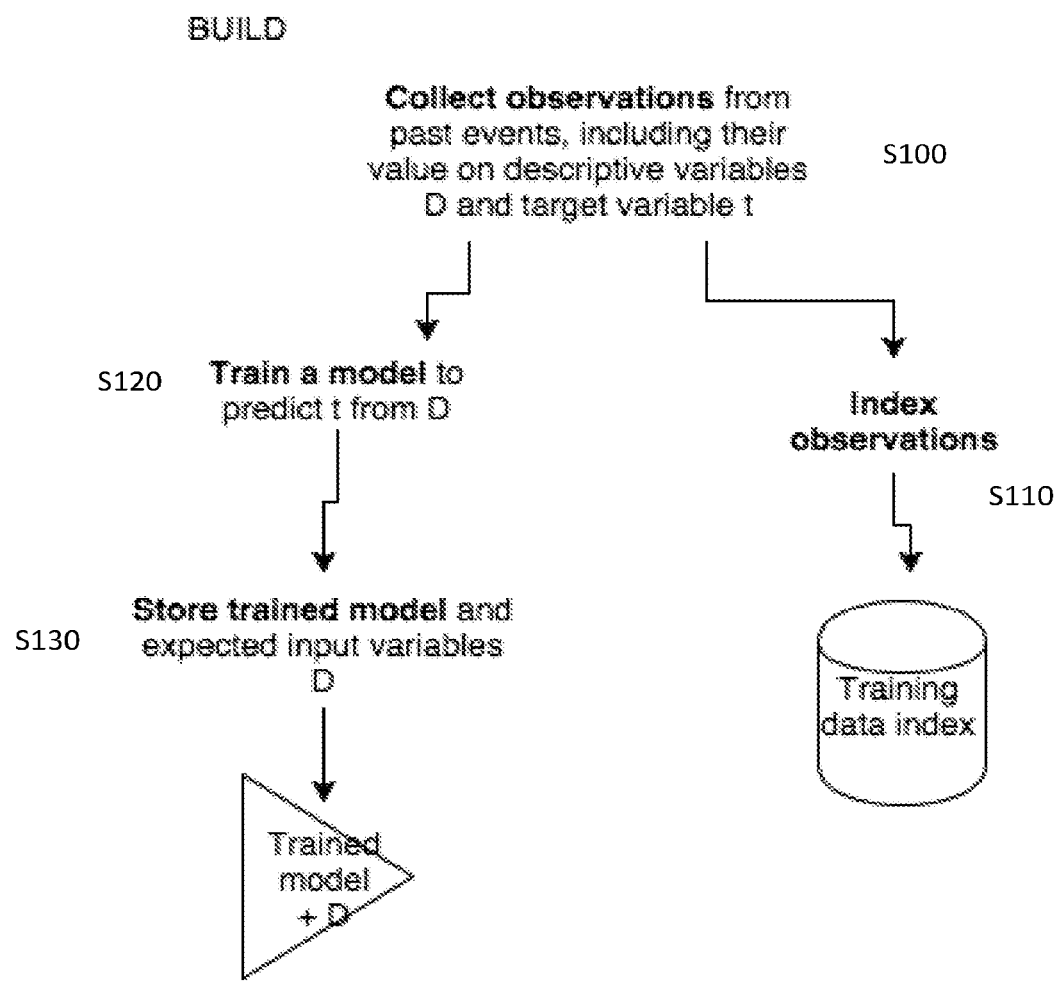
FIG. 1 shows a flowchart of an example of a build time of the invention.
Figure 2:
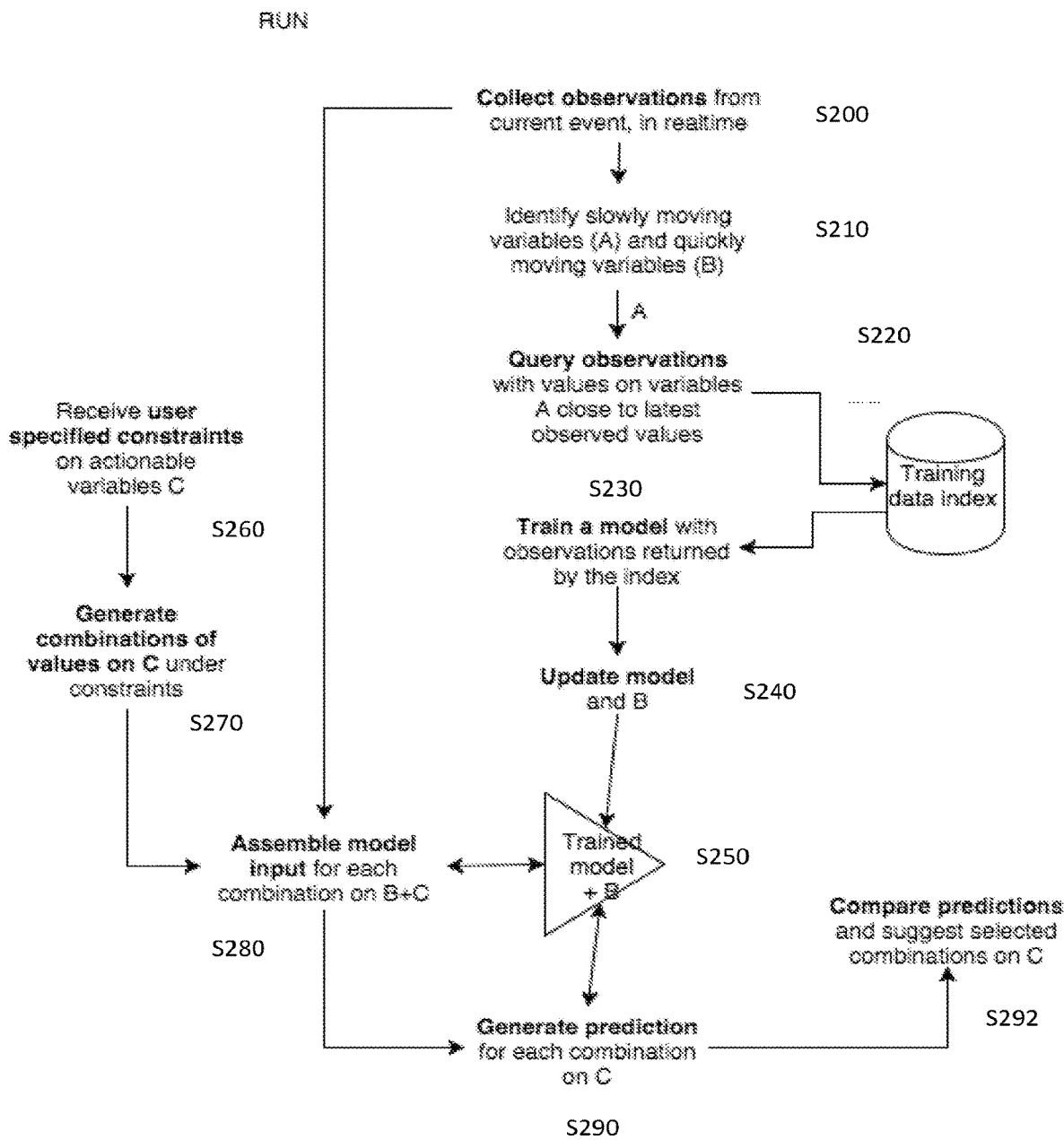
FIG. 2 shows a flowchart of an example of a run time of the invention.

With reference to the flowcharts of FIGS. 1 and 2, a computer implemented method for updating a model of a machine learning system is described. The method comprises providing a first model. The method also comprises providing a first set of observations of similar events, each observation being associated (i) with one or more variables and being associated (ii) with a target value, each said variable being associated with a value corresponding to the event. The method also comprises indexing each observation of the first set with its corresponding one or more variables and target value. Then, a query is received on the index; the purpose of the query is to obtain a selection of a subset of the first set of observations. As a result of the query, a subset of the first set of observations is returned. Next, a second model is provided. The second model is trained with the returned subset of the first set of observations. The trained second model is then loaded.

Such a method improves the update of a model of a machine learning system. Indeed, an index of the training data is used. The training data are sampled according to a current situation, and a model is retrained based on sampled data.

In cases where vast amounts of training data are available, and time is scarce, removing data based on the current situation drastically reduces the size of the training set while keeping most of the relevant information it contains with regards to the current situation. For example, if the engine of a space shuttle can only provide limited thrust, data on previous missions with an engine providing a higher thrust than the limit has little value.

Setting up selected variables to their current value in the situation allows reducing of the dimension of the matrix storing the observations. The number of lines (the observations) can be reduced by eliminating the observations whose values on the selected variables are different from their values in the current situation. The resulting matrix is smaller than the original matrix (potentially by orders of magnitude), without substantial loss of information. The memory footprint for training is roughly the size of the matrix. Therefore the memory footprint increases linearly with the size of the matrix. The time to train is a direct function of the number of variables and observations. The time to train a machine learning algorithm increases typically faster than linearly in terms of the size of the training data.

The invention is not incompatible with using incremental or online learning algorithms. In fact the invention can alleviate the drawbacks of incremental or online learning algorithms because it makes it possible/easier to batch-update a model, models can be fully updated using the invention, and iteratively updated using incremental or online learning techniques in-between the batch updates.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally manipulates sets of observations. An observation is a set of variables, wherein each variable is associated with a value. A variable represents a state of a system or of a part of it, or the state of an element in relation with or which has an influence on the system or a part of it. For instance, the variables of an observation of a car can be the temperature of the car, the oil pressure, instant fuel consumption, average fuel consumption during a race, the kind of tyres, the temperature of the air, the weather (rain, sun, snow) . . . . The variable is associated with a value that quantifies the state of the variable. An observation represents a state of the system at a given point in time. A set of observations is thus the value of the variable at different point in time. In practice, the system can belong in various and unlimited industrial fields, including: aerospace, architecture, construction, consumer goods, high-tech devices, industrial equipment, transportation, marine, and/or offshore oil/gas production or transportation. The set of observations used by the method may thus comprise the variables related to an industrial system which may be any mechanical system, such as system of a terrestrial vehicles or a part of it (including e.g. car and light truck equipment, racing cars, motorcycles, truck and motor equipment, trucks and buses, trains), a system of an aerial vehicle or a part of it (including e.g. airframe equipment, aerospace equipment, propulsion equipment, defense products, airline equipment, space equipment), a system of a naval vehicle or a part of it (including e.g. navy equipment, commercial ships, offshore equipment, yachts and workboats, marine equipment), a general mechanical system or a part of the mechanical system (including e.g. industrial manufacturing machinery, heavy mobile machinery or equipment, installed equipment, industrial equipment product, fabricated metal product, tire manufacturing product), an electro-mechanical or electronic system or a part of it (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 4:
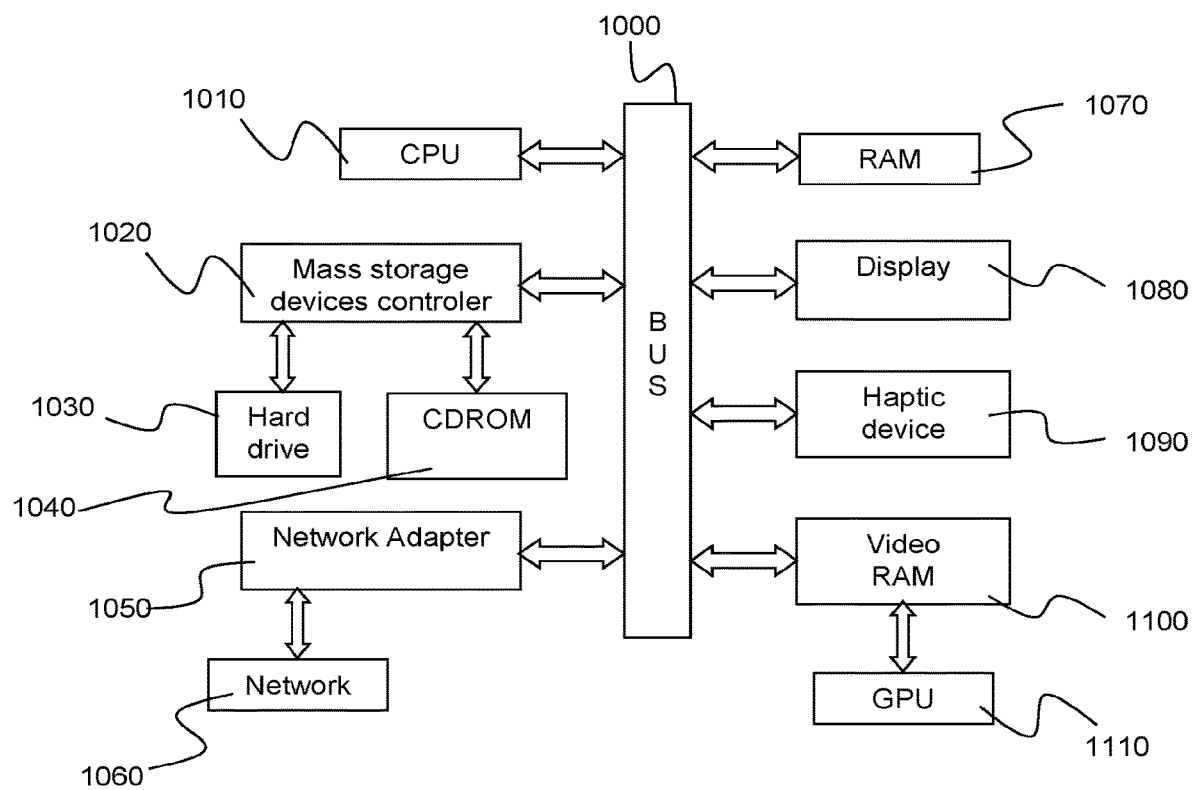
FIG. 4 shows an example of a computer.

FIG. 4 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring now to FIG. 1, an example of build time of the invention is described. The build time notably aims at creating an index of observations. The observations may be observations of the past.

At step S100, a first set of observations is provided. Each observation of the set is associated with one or more variables and a target value. The variables are associated with values.

Figure 3:
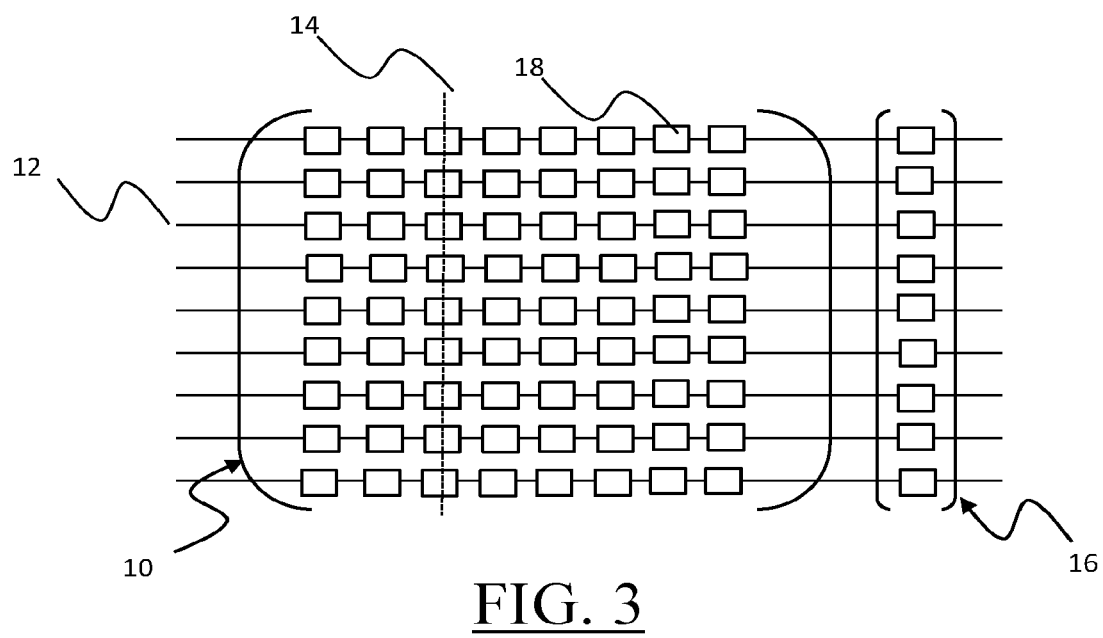
FIG. 3 shows an example of a set of observations.

FIG. 3 shows an example of observations. Each line 12 represents an observation, each column 14 (only one is represented with a dotted line in FIG. 3 for clarity reason)

corresponds to a variable, and each rectangle 18 represents the value of a variable for an observation. In this example, the set of observations is stored on a matrix 10. Each observation is described with its values on so-called « descriptive variables » also known as « input variables » (because they are provided as input of a trained model to describe an observation). Interestingly, each observation of the set comprises the same variable as the other observations of the set. It is to be understood that for each observation, one or more variable can be empty, that is, not associated with a value. Each observation is associated with corresponding values on so-called « target variables » also known as « output variables ». The target variables are the variables that trained models must evaluate for new observations. Target variables are meaningful for the user of the model in the sense that they provide information that help the user of the model understand and/or predict and/or react to the behavior of the system. In this example, the target variables are also stored in a matrix 16. It is to be understood that the values and the target variables of each observation can be stored in a single matrix comprising the matrices 10 and 16. The observations and the target variables form (and are referred to as) a set of tagged data. It is to be understood that each target variables is evaluated to a value so-called target value.

The set of observations may represent similar events. Similar events means that the events have common characteristics. In practice, each observation is associated with one or more variables. The common characteristics between the events can be the variables. Hence, and in reference to FIG. 3, each observation of the set of observations describes an event that is the same with the same variables, excepted that the variables between two observations may have different values.

The set of observations may be a natural set of observations. Natural means that the values of the variables have been measures on a real event, that is, an event that occurred in the real-world, e.g. the temperature of the engine of a space shuttle. The observations and the variable of each observation are thus collected.

The set of observations may be a synthetic set of observations. Synthetic means that the values of the variables have been computed. For instance, they have been generated. There are multiple approaches for generating synthetic observations. In the following we describe two approaches.

Both approaches start with identifying the range of values that can be taken by the variables of the set of observations. Some variables can only take discrete values. These are discrete variables. Others can take continuous values. These are continuous variables.

Both approaches involve generating values on each variable of the observations, and combining these values to form synthetic observations. For example if variable A takes values [1, 2, 3] and variable B takes values [1, 2], the combinations are (1, 1), (1, 2), (2, 1), (2, 2), (3, 1), (3, 2). That is |A|*|B| combinations. In this example, six new observations can be created, each defined by its values on variables A and B, and corresponding to the six combinations of possible values of A and B.

Both approaches may involve generating a target value for each observation. The target value is the value of a target variable associated to the observation. It is typically generated by a simulation model when given the variables of the observation in input. The target variable is the variable that a machine learning algorithm learns to produce when trained with observations associated with their respective target values. By this process of learning, known in the state of the art of machine learning, the machine learning algorithm will learn to produce target values consistent with those of observations with which it was trained, in response to new observations similar to those with which it was trained.

The two approaches differ by the method used to generate values on each variable.

A first approach may consist in using random variate generators to generate values on the range of definition of a variable, possibly following a uniform distribution on the range of distribution, or following a different probability distribution according to the needs (for example, if one wants models to be particularly well trained for observations that take values similar to a value V for a specific variable, one may decide to use a probability distribution that will favor values close to V for that variable, such as a normal distribution centered around V.)

A second approach may consist in enumerating possible values for a variable on its range of possible values, possibly after approximating the variable with a discrete variable, that is, a variable that takes discrete values. This approximation can be done by approximating each value with the closest discrete value of the discrete variable. Discrete values can for instance be defined as values rounded to a specified level of precision. In practice, variables that represent a physical event only take values on a bounded range of definition: there is a lower bound and an upper bound. These bounds can be found, typically by looking at past data. A discrete variable will take a finite number of values on a bounded range of definition. This makes it possible to enumerate all possible values of the discrete approximation, if this is what one wants to achieve.

The set of observation may be a mix of natural and synthetic observations. For instance, if the number of natural observations is too small and thus not representative enough of an event, the set of observations may be completed with synthetic observations so that the set of observations is statistically representative of the set of possible observations on which the model is to be used.

Next, at step S110, the observations of the first set are indexed. This index is referred to as the training data index. In order to support search based on the exact value of a variable, an index contains inverted lists for each variable susceptible to be used in a query. The inverted list corresponding to a variable is a list of couples (value, [$id_1$, ..., $id_n$]) where value is a value of the variable and [$id_1$, ..., $id_n$] is a list of the identifiers of the observations for which the variable has value value. This structure allows retrieving of models faster upon a query that specifies the values of variables. Indeed, the inverted lists are sorted so it is quicker to find the specified value in a sorted inverted list than to look through all observations and check their corresponding associated values.

In order to support search for similar values in an index with inverted lists, one approach is to discretize values before adding them to the inverted lists, and search for all discrete values within a distance of the value specified in the query. In this context, discretizing values means approximating them with rounded values at a precision level smaller than the distance.

Each observation of the first set is indexed with its corresponding variables and its target value. It is to be understood that indexing the observation with its corresponding variables means that the value of the variables are indexed with the observation, that is, the observation will be found associated with the value in the inverted list corresponding to the variable.

Then, at steps S120, a model is trained. A model is provided. The selection of the model is performed in accordance with the target variable on which to predict. The model may be selected in a library of models.

The training of the model is performed as known in the art. The method for training a model varies from one model to another. For example, training an Artificial Neural Network involves using the Backpropagation algorithm to update characteristics of the neurons of the network based on how the network behaves prior to the update in response to a new observation being inputted to the network, and based on the difference between the output of the network and the target value associated with the observation. Training an Ensemble model such as Gradient Boosting or Random Forest involves selecting many subsets of observations and for each subset training a simple estimator such as a Stub to output the target values given the observations of the subsets, and adding the trained estimator to the list of estimators of the overall Ensemble model. Training a Stub ([[=]] a one-level Decision Tree) involves selecting the variable and the values of that variable that best discriminates among selected observations those associated with different target values.

Machine learning libraries typically implement a method for training each available model and provide that method to the user of the library. The user can train a model by inputting this method with a selection of observations and their target values that will be used as training data. The method usually returns a pointer to a trained model that can then be used to predict target values given new observations.

The trained model is then stored at step S130, e.g. on Random Access Memory for execution and on a filesystem for persistence. The stored model can therefore be reused at a later stage during the run time.

It is to be understood that the building of the index and the training of the model may be carried simultaneously or in parallel. Alternatively, the model may be trained first and then the first set of observation can be indexed.

Referring now to FIG. 2, it is discussed an example of the run time of the invention. The run time notably comprises receiving, on the index, a query (S220) allowing a selection of a subset of the first set of observations; returning, as a result of the query, a subset of the first set of observations; providing a second model; training the provided second model (S240) with the returned subset of the first set of observations; and loading (S250) the trained second model.

At step S200, a set of second observations is collected. The observations of the second set are related to current events. Current events are event that occur in the present, opposed to the events of the first set of observations.

The second set of observations may represent events that are similar to the past or simulated events stored in the first set of observations. The observations of the second set comprise at least the same variables as the set of observations depicting the past or simulated events. For the sake of explanation, similar events means that the events have common characteristics. In practice, the collected data are observations of similar events, each observation being associated with one or more variables. The common characteristics between the events can be the variables. Hence, each observation of the second set of observations describes an event that is similar with the same variables, excepted that the variables between two observations may have different values.

The values of the variables of the second set of observations are measured, that is, the second set observations only comprises values of the variables that have been measured on a real event. The measured values of the measured variables are preferably transmitted in real time to the system that performs the method. This can be done by means of subscription to real time push notifications from data providers or sensors via any telecommunication channel, and subscription or messaging protocol. It is to be understood that the channel typically depends on the interface provided by the data provider or the sensors. Here, the term real-time means that the time for transferring the collected data is a pre-determined period of time; the time required for the transfer should not exceed the pre-determined time period.

The collected observations of the second set are preferably collected in real time. This allows providing the system executing the invention with the latest measured variable. The predictions will be performed with fresh data. The collected data can be stored so that they can be reused at a later stage. In order to limit the consumption of computing resources, the access to the collected data may be allowed only when a predetermined number of new observations have been stored, or when a predetermined period of time has elapsed.

Then, at step S210, a filtering is applied on the variables of the observations of the second set. Filtering means that a selection is performed according to one or several criterion. For instance, the filtering may comprises identifying slow moving variables. Slow moving variables are variables that exhibited a small variance in a number of recent successive observations in the second set of observations. Typically, selecting slow moving variables aims at filtering observations from the first set that are likely to be similar to these recent observations of the second set, and hence to a number of observations of the second set that will be collected next, under the assumption that variables that exhibited stable values on recent observations of the second set are likely to exhibit similar values in the next observations of the set.

For example the 10% most stable variables on the last hundred observations of the second set can be selected. This may aim to improve the likelihood that filtered observations of the first set are similar for instance to the next fifty observations of the second set.

Then, at step S220, the index of the observations of the first set is queried. The query allows a selection of a subset of the first set of observations that are indexed. The query is performed with one or more variables of the second set of observations that were collected. In practice, one or more variables of the query are the values of the identified variables at step S210.

As a result of the query, a subset of the first set of observations is returned. This is performed as known in the art.

Then, a second model is provided. The selection of this second model may be performed the same way as the selection of the first one. The second model may be the same as the first model.

At step S230, the second model previously provided is trained with the subset of observation returned as a result of the query (S220).

The second model can be stored once the training is done. It may be stored on the same memories (typically random access memory for execution and filesystem for persistence) used for storing the first trained model.

The second trained model can be loaded; that is, it can be used for generating predictions.

The collected data of the second set of observations may be used for maintaining updated the index computed at step S110. Instead of indexing all the new observations, one identifies one or more missing values among the variables of the second set of observations and their target variables. When the missing values are detected, the corresponding observations are indexed. The indexation is performed the same way as discussed in reference to step S110: the indexation of each observation of the second set associated with the identified one or more previously missing values is performed with the corresponding variables and target value.

It is now discussed how to generate predictions using the first and/or second trained models.

At step S260, one or more options are provided. An option is a hypothetic observation that describes a possible turn of event For example, say observations are described by variables "Cabin Fire" (yes/no), "Fire Extinguisher Status" (on/off), "Current Procedure" (as defined in the Flight Data File). In an event described by the situation Cabin Fire=yes, Fire Extinguisher Status=off, Current Procedure=countdown, the decision to use fire extinguishers and pause the countdown translates into the selection of the option defined by Cabin Fire=yes, Fire Extinguisher Status=on, Current Procedure=countdown_paused.

Options are obtained by setting the variables of the observations. As compared to observations of the first and second sets, options are obtained first without an associated target value. These variables are called actionable variables because the user can act on them, e.g. setting the thrust of an engine.

There are multiple approaches for generating options. In the following we describe two approaches.

Both approaches start with identifying the range of values that can be taken by the variables of the set of observations. Some variables can only take discrete values. These are discrete variables. Others can take continuous values. These are continuous variables.

Both approaches involve generating values on each variable of the observations (S270), and combining these values to form synthetic observations. (S280) For example if variable A takes values [1, 2, 3] and variable B takes values [1, 2], the combinations are (1, 1), (1, 2), (2, 1), (2, 2), (3, 1), (3, 2). That is |A|*|B| combinations. In this example, six new observations can be created, each defined by its values on variables A and B, and corresponding to the six combinations of possible values of A and B.

The two approaches differ by the method used to generate values on each variable (in S270).

A first approach may consist in using random variate generators to generate values on the range of definition of a variable, possibly following a uniform distribution on the range of distribution, or following a different probability distribution according to the needs (for example, if one wants models to be particularly well trained for observations that take values similar to a value V for a specific variable, one may decide to use a probability distribution that will favor values close to V for that variable, such as a normal distribution centered around V.)

A second approach may consist in enumerating possible values for a variable on its range of possible values, possibly after approximating the variable with a discrete variable, that is, a variable that takes discrete values. This approximation can be done by approximating each value with the closest discrete value of the discrete variable. Discrete values can for instance be defined as values rounded to a specified level of precision. In practice, variables that represent a physical event only take values on a bounded range of definition: there is a lower bound and an upper bound. These bounds can be found, typically by looking at past data. A discrete variable will take a finite number of values on a bounded range of definition. This makes it possible to enumerate all possible values of the discrete approximation, if this is what one wants to achieve.

Now the inputs to be provided to the second trained model are available. The second trained model can thus be used for generating outcomes (S290); prediction for each option obtained at step S270 or step 280 is computed. The computations of the outcomes are performed as known in the art. Hence, predictions are computed from the provided one or more options, or predictions are computed from the combination of the provided one or more options and the values of variables of the second set of observations.

A suggestion (S292) can be made by selecting the best option or few best options according to the predictions and a function of the prediction that represents the attractiveness of the option.

It is now discussed an example of the invention for helping mission control crew and on-board crew to take decisions during the operation of an orbiter for the launch of a satellite. It is true that in these operations, most actions are effected according to automated programs and planned procedures. Most engines are servo-controlled: the user does not act directly on them but you give them a target and they adapt to reach it.

Set of guidelines and planned events are in the Flight Data File. The Flight Data File includes the crew activity plan, payload handbooks, and other documents which are put together during the elaborate flight planning process. Types of problems are segmented and actions are planned in advance with the objective to anticipate every type of problems.

However, the mission control crew and on-board crew still need to take decisions at all times. For example, NASA states that among all abort modes, the abort-to-orbit is the preferred mode when possible, and one reason is that it gives controllers and flight crew the time to assess the situation, and decide to land or continue as planned, and how fix the problem. However this time is expensive as the mission is on hold, resources are being consumed, and the problem may be aggravating. When abort-to-orbit is not possible, the speed and quality of the decisions are even more important.

Several variables can be measured for a space shuttle: engine throttle for each engine, fuel levels for each engine, cabin pressure (problem if depressurization), status of orbiter cooling systems (problem if loss of one), altitude, flight path angle, heading, weight, velocity/range, pressures on the vehicle's surface, electrical system status, current procedure (countdown/first stage/second stage/Return to Launch Site/Trans-Atlantic Abort Landing/Abort Once Around/Abort to Orbit/Contingency Abort/Extra-vehicular activity), and so on. Still in this example, actionable variables include: engine throttle for each engine system, fuel levels (fuel can be dumped, weight (material can be dumped), choice of maneuver (to change altitude, attitude, flight angle, heading, etc.), choice of procedure, and choice of orbit.

In this context, the present invention can be applied to use options that maximize the estimated chance of placing the satellite on the right orbit, landing without risk when coming back to earth, minimizing the overall cost of the mission, for instance by minimizing damages to the material, and minimizing incidents in the interior of the cabin susceptible to result in injuries or casualties of crew members.

A number of observations is indexed and filtered, and a machine learning algorithm is trained with the filtered observations, for example based on the fact that they correspond to a phase 1 flight procedure. In the course of the event, new observations descriptive of the events are collected. Indexed observations are filtered based on the new observations. For example, the mission entered a new flight procedure. It left phase 1 and entered phase 2 of the launch. New observations all exhibit the value « phase_2 » on variable « Flight Procedure ». Indexed observations that correspond to a phase 2 flight procedure are filtered (based on the fact that their value on variable Flight Procedure is phase_2) and a machine learning algorithm is trained on these filtered observations and updates (in the sense that it replaces) the first machine learning algorithm. All variables listed above form the input variables of the machine learning algorithms, and the estimated outcome of the option is the target variable of the machine learning algorithm. The updated model is applied to the generated options to predict their outcome.

For instance, this can be used to answer a question such as: "which is the preferred orbit for an Abort-to-Orbit mode?" Or: "which is the preferred abort mode?" in a case where multiple abort modes are possible.

For instance, machine learning algorithm trained to assess abort modes will take in input observations that specify the abort mode (in one variable) and the context in which it is selected (in the other variables). It is the context that makes the abort mode relevant or not, and the relevance of each abort mode in their respective contexts is assessed by the outcome of the machine learning algorithm when receiving the corresponding observations in input.

The invention claimed is:

1. A computer-implemented method for updating a model configured to output predictions on a system, comprising:
  obtaining a first set of observations of similar events, each observation being a set of one or more variables representing a state of the system at a given point in time, each variable being associated with a value corresponding to the observation, each observation being associated with a target value, the target value being a value of a target variable of the observation, the target variable being a variable representing a prediction of a behavior of the system for the observation;
  generating an index of the observations of the first set by indexing each observation of the first set with its corresponding one or more variables and target value so that each observation of the first set can be retrieved from the index with a search based on at least one exact value of a variable of the observation;
  obtaining the model;
  training the obtained model with the first set of observations, the model being trained for, based on a given observation, evaluating a corresponding target variable;
  storing the trained model;
  collecting a second set of observations of current events that are similar to the events of the first set of observations, each observation of the second set being a set of variables, the observations of the second set including at least the same variables as the observations of the first set;
  filtering the variables of the observations of the second set by identifying, from the variables of the observations of the second set, variables that exhibit a smaller variance in a number of successive observations in the second set of observations than that of one or more other variables of the variables of the observations of the second set;
  receiving, on the index, a query allowing a selection of a subset of the first set of observations, the query being performed with one or more of the identified variables of the second set of observations and specifying the values of the one or more of the identified variables so that the subset is retrieved based on the exact values of the one or more of the identified variables;
  returning, as a result of the query, a subset of the first set of observations;
  obtaining the model trained with the first set of observations;
  training the model with the returned subset of the first set of observations, the model being trained for, based on a given observation, evaluating a corresponding target variable; and
  loading the model trained with the returned subset of the first set of observations, for use.

2. The computer-implemented method of claim 1, further comprising:
  identifying one or more unknown variables among the variables of the second set of observations, an unknown variable being a variable having one or more missing values; and
  indexing each observation of the second set associated with the identified one or more unknown variables, the indexing of each observation of the second set being performed with the corresponding one or more variables and target value of each observation of the second set.

3. The computer-implemented method of claim 1, wherein collecting the second set of observations further comprises:
  collecting in real time the second set of observations;
  storing the collected second set of observations; and
  providing an access to the collected second set of observations before a predetermined period of time elapsed.

4. The computer-implemented method of claim 1, further comprising after loading the trained model:
  providing one or more options by setting input variables of a set of input variables with a value; and
  computing an outcome for the trained model by using the provided one or more options.

5. The computer-implemented method of claim 4, wherein providing one or more options further comprises:
  computing combinations of the values of input variables, and
  wherein computing an outcome for the trained model further comprises:
  computing an outcome for the trained model by using the combinations computed.

6. The computer-implemented method of claim 5, further comprising
  after computing combinations of the values of input variables:
  receiving values of variables of the second set of observations,
  computing combinations of the values of input variables and values of variables of the second set of observations, and
  computing an outcome for the trained model by using the combinations of the values of input variables and of variables of the second set of second observations.

7. A non-transitory computer readable storage medium having recorded thereon a computer program that when executed by a computer causes the computer to implement a method for updating a model configured to output predictions on a system, the method comprising:
  obtaining a first set of observations of similar events, each observation being a set of one or more variables representing a state of the system at a given point in time, each variable being associated with a value corresponding to the observation, each observation being associated with a target value, the target value being a value of a target variable of the observation, the target variable being a variable representing a prediction of a behavior of the system for the observation;

generating an index of the observations of the first set by indexing each observation of the first set with its corresponding one or more variables and target value so that each observation of the first set can be retrieved from the index with a search based on at least one exact value of a variable of the observation;

obtaining the model;

training the obtained model with the first set of observations, the model being trained for, based on a given observation, evaluating a corresponding target variable;

storing the trained model;

collecting a second set of observations of current events that are similar to the events of the first set of observations, each observation of the second set being a set of variables, the observations of the second set including at least the same variables as the observations of the first set;

filtering the variables of the observations of the second set by identifying, from the variables of the observations of the second set, variables that exhibit a smaller variance in a number of successive observations in the second set of observations than that of one or more other variables of the variables of the observations of the second set;

receiving, on the index, a query allowing a selection of a subset of the first set of observations, the query being performed with one or more of the identified variables of the second set of observations and specifying the values of the one or more of the identified variables so that the subset is retrieved based on the exact values of the one or more of the identified variables;

returning, as a result of the query, a subset of the first set of observations;

obtaining the model trained with the first set of observations;

training the model with the returned subset of the first set of observations, the model being trained for, based on a given observation, evaluating a corresponding target variable; and loading the model trained with the returned subset of the first set of observations, for use.

8. A server comprising:

processing circuitry coupled to a memory, the memory having recorded thereon a computer program for updating a model configured to output predictions on a system, the processing circuitry implementing the computer program by being configured to:

obtain a first set of observations of similar events, each observation being a set of one or more variables representing a state of the system at a given point in time, each variable being associated with a value corresponding to the observation, each observation being associated with a target value, the target value being a value of a target variable of the observation, the target variable being a variable representing a prediction of a behavior of the system for the observation;

generate an index of the observations of the first set by indexing each observation of the first set with its corresponding one or more variables and target value so that each observation of the first set can be retrieved from the index with a search based on at least one exact value of a variable of the observation;

obtain the model;

train the obtained model with the first set of observations, the model being trained for, based on a given observation, evaluating a corresponding target variable;

store the trained model;

collect a second set of observations of current events that are similar to the events of the first set of observations, each observation of the second set being a set of variables, the observations of the second set including at least the same variables as the observations of the first set;

filter the variables of the observations of the second set by identifying, from the variables of the observations of the second set, variables that exhibit a smaller variance in a number of successive observations in the second set of observations than that of one or more other variables of the variables of the observations of the second set, receive, on the index, a query allowing a selection of a subset of the first set of observations, the query being performed with one or more of the identified variables of the second set of observations and specifying the values of the one or more of the identified variables so that the subset is retrieved based on the exact values of the one or more of the identified variables;

return, as a result of the query, a subset of the first set of observations;

obtain the model trained with the first set of observations;

train the model with the returned subset of the first set of observations, the model being trained for, based on a given observation, evaluating a corresponding target variable; and load the model trained with the returned subset of the first set of observations, for use.

9. The server of claim 8, wherein the server is connected to a client computer from which the query on the index is generated.

* * * * *